United States Patent
Merwerth et al.

(10) Patent No.: US 8,575,807 B2
(45) Date of Patent: Nov. 5, 2013

(54) ELECTRICAL DRIVE MOTOR FOR A VEHICLE

(75) Inventors: Joerg Merwerth, Dachau (DE); Jens Halbedel, Puchheim (DE); Guenter Schlangen, Kaufering (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 13/455,933

(22) Filed: Apr. 25, 2012

(65) Prior Publication Data

US 2012/0267977 A1    Oct. 25, 2012

Related U.S. Application Data

(63) Continuation of application No. PCT/EP2010/065844, filed on Oct. 21, 2010.

(30) Foreign Application Priority Data

Oct. 28, 2009 (DE) .................. 10 2009 050 991

(51) Int. Cl.
*H02K 21/12* (2006.01)

(52) U.S. Cl.
USPC .................................................. 310/156.57

(58) Field of Classification Search
USPC .............. 310/156.53, 156.54, 156.56, 156.57
See application file for complete search history.

(56) References Cited

U.S. PATENT DOCUMENTS

| | | | |
|---|---|---|---|
| 4,626,727 A | 12/1986 | Janson | |
| 4,658,165 A * | 4/1987 | Vanderschaeghe | 310/156.57 |
| 5,030,864 A | 7/1991 | Van Hout et al. | |
| 7,915,776 B2 * | 3/2011 | Takahata et al. | 310/156.57 |
| 2007/0152527 A1 * | 7/2007 | Yura et al. | 310/156.53 |
| 2009/0224624 A1 | 9/2009 | Kumar et al. | |

FOREIGN PATENT DOCUMENTS

| | | |
|---|---|---|
| DE | 39 21 725 A1 | 1/1990 |
| DE | 43 24 786 A1 | 1/1995 |
| JP | 2004-104962 A | 4/2004 |
| JP | 2005-261046 A | 9/2005 |
| JP | 2006-121765 A | 5/2006 |

OTHER PUBLICATIONS

Machine Translation foe JP 2006-121765 (Jun. 16, 2013).*
International Preliminary Report on Patentability with Written Opinion dated May 30, 2012 (eight (8) pages).
German Search Report dated Jun. 2, 2010 including partial English-language translation (Nine (9) pages).
International Search Report dated Mar. 2, 2012 including English-language translation (Four (4) pages).

* cited by examiner

*Primary Examiner* — Nguyen N Hanh
(74) *Attorney, Agent, or Firm* — Crowell & Moring LLP

(57) ABSTRACT

An electric drive motor that is intended for a vehicle, in particular for a motor vehicle, includes a stator and a rotor with at least one pole pair, wherein each pole of a respective pole pair has a magnet arrangement having at least one buried magnetic layer. The drive motor is characterized in that each pole has a number of magnetic flux influencing groups, each of which has a number of air-filled recesses, which are not assigned to a magnet of a respective magnetic layer for purposes of flux conductance.

16 Claims, 4 Drawing Sheets

ELECTRICAL DRIVE MOTOR FOR A VEHICLE

CROSS-REFERENCE TO RELATED APPLICATIONS

This application is a continuation of PCT International Application No. PCT/EP2010/065844, filed Oct. 21, 2010, which claims priority under 35 U.S.C. §119 from German Patent Application No. DE 10 2009 050 991.7, filed Oct. 28, 2009.

BACKGROUND AND SUMMARY OF THE INVENTION

The invention relates to an electric drive motor that is intended for a vehicle, in particular for a motor vehicle, and that comprises a stator and a rotor with at least one pole pair, wherein each pole of a respective pole pair comprises a magnet arrangement having at least one buried magnetic layer. In particular, the invention relates to permanently excited synchronous motors.

It is often the case that permanently excited synchronous motors exhibiting a strong magnetic asymmetry in the rotor are used as electric drive motors. Such drive motors are used, for example, as a traction drive in motor vehicles. The difference, generated in these drive motors, between a series inductance Ld in the direction of the magnets (that is, in the direction of the pole or along the so-called d axis) and a cross inductance Lq transversely to the direction of the pole (that is, along the so-called q axis) produces a so-called reluctance torque when the drive motor is suitably actuated. This additional torque acts in addition to the moment generated by the permanent magnetic flux.

Permanently excited synchronous motors exhibiting a large magnetic asymmetry can be operated in a large range of constant power. This range is called the so-called field weakening range. In the case of traction drives there is the desire that the ratio of a maximum speed $n_{max}$ to a so-called transition speed $n_e$ be very large. The transition speed $n_e$ lies at the border between the field weakening range and the armature adjustment range. This generally known fact is shown, for example, in FIG. 1. Especially in the field weakening range the magnetic asymmetry of the rotor and the field weakening current (so-called d current) flowing in the stator generates not only the so-called q current that is also present, but also an additional moment, which can be exploited in an advantageous way in the drive motor.

The magnetic asymmetry in the rotor of the electric drive motor is the result of the design layout of the magnet arrangement comprising at least one buried magnetic layer. In this respect FIGS. 2 and 3 show in each case the generally known prior art configurations, wherein, for example, two magnetic layers are arranged one above the other (that is, one above the other in the radial direction) in the rotor. At the same time FIGS. 2 and 3 show in each case the magnet arrangement 23 of a pole 21a of a pole pair. The magnet arrangements shown in the figures can be provided with a single pole pair or a plurality of pole pairs in the rotor.

FIG. 2 shows a so-called V magnet arrangement. In this case a first magnetic layer L1 has a first magnet 24-1 and a second magnet 24-2 in a V configuration in the rotor 20. In the radial direction below the magnetic layer L1 there is an additional magnetic layer L2 comprising a first magnet 25-1 and a second magnet 25-2, also in a V configuration. In principle, a larger number of magnetic layers is possible, but the number is kept within limits for production and implementation reasons. In practice, more than three magnetic layers are rarely implemented. In this case the magnets 24-1, 24-2, 25-1, 25-2 are introduced into the punched recesses 34 of the so-called rotor iron of the rotor 20. The recesses 34 are usually introduced into the rotor iron by means of a punching process. The stator in turn is made of a plurality of metal sheets. In this case the first and the second magnets 24-1, 25-1 or 24-2, 25-2 respectively are arranged symmetrically relative to the so-called d axis. The so-called q axis represents a transverse axis relative to the d axis and runs transversely to the direction of the pole (that is, transversely to the d axis).

FIG. 3 shows the magnet arrangement 23 as a so-called parallel magnet arrangement with additional air caverns. The first magnetic layer L1 comprises a magnet 24 that is arranged symmetrically relative to the d axis and is introduced into a recess 34 of the rotor iron. Each of the opposite ends of the magnet 24 has an air cavern 26, 27 respectively, which serves, as known from the prior art, to conduct the magnetic flux. The air caverns 26, 27 represent air-filled recesses in the rotor iron. A second magnetic layer L2 comprises in an analogous manner a magnet 25, which is arranged symmetrically relative to the d axis and which is disposed in the recess 34. Each of the opposite ends of the magnet 25 exhibits an air cavern 28, 29 respectively.

In the exemplary embodiments shown in FIGS. 2 and 3, the second magnetic layer L2 forms the bottommost magnetic layer, which comes to rest in sections against a pole 22a, 22b adjacent to the pole 21a.

As known from the prior art, the current, flowing in the stator of the drive motor (not illustrated in FIGS. 2 and 3), in the field weakening range has a substantial d component. The magnetic field, which is generated by this current component, acts against the field of the permanent magnet. However, as a rule the flux density in the magnet material is not reduced; rather the magnetic flux is expelled from the stator. The magnetic flux seeks a path along an air gap, formed between the stator and the rotor, in the rotor iron of the drive motor. The bottlenecks that the magnetic flux finds in its path—the so-called magnetic pockets—induce in connection with the current of the stator the path of the magnetic flux to switch back and forth multiple times between the rotor and the stator. As a result, the flux density fluctuates in the teeth of the stator, so that the frequency of the flux density fluctuation significantly exceeds the base frequency of the electric drive motor. This situation leads to significantly higher iron losses and, thus, to a considerable reduction in the efficiency of the motor. This effect occurs especially in the field weakening range, for which the motor should be optimized based on its operating characteristics (cf. FIG. 1).

A well-known possibility of suppressing the flux density fluctuations between the rotor and the stator consists of making the bottlenecks, which occur in the path of the magnetic flux, more uniform. This feature can be implemented by increasing the number of magnetic layers. However, such a design is impractical to manufacture, because then the magnets have to be very thin. Inherent in such an approach is the high risk that the magnets will break when they are inserted into their recesses. The result is a steep increase in the production costs.

The path of the magnetic flux without a field weakening current and in a field weakening mode is shown for the magnet arrangement from FIG. 3 in FIGS. 4 and 5. In each instance the magnetic flux is identified with the symbol RF. In addition, a detail of the rotor 10, situated opposite the pole 21, is shown. The rotor 10 has, as is well-known from the prior art, a number of grooves 11, into which windings 12 (shown only in FIG. 5) are introduced for the purpose of conducting the current. The stator 10 is arranged at a distance from the rotor 20, so that an air gap 15 is formed between the two components.

FIG. 4 shows the situation, in which there is no field weakening current flow in the stator 10. In this case the magnetic flux RF extends parallel to the d axis from the rotor 20 in the direction of the stator 10. In FIG. 5 a field weakening is produced by the flow of a d current into the windings 12. The magnetic flux RF is expelled from the stator 10 by the field weakening current and seeks a path along the air gap 15 in the rotor iron of the rotor 20 of the drive motor. The windings marked with the reference numeral 13 carry a current that flows into the sheet plane. The windings 12, marked with the reference numeral 14, carry a current that flows out of the sheet plane. In the drawing a plain d current is shown for the purpose of elucidating the situation. Under normal operating conditions a q current, which is not depicted in the figure, would also be constantly flowing.

The object of the present invention is to provide an electric drive motor that is intended for a vehicle, in particular a motor vehicle, as a traction drive, which has a higher efficiency when running in the field weakening range.

The invention provides an electric drive motor for a vehicle, in particular for a motor vehicle. This electric drive motor has a stator and a rotor having at least one pole pair. Each pole of a respective pole pair comprises a magnet arrangement comprising at least one buried magnetic layer. According to the invention, each pole has a number of magnetic flux influencing groups, each of which has a number of air-filled recesses, which are not assigned to a magnet of a respective magnetic layer for purposes of flux conductance.

Owing to the magnetic flux influencing groups the magnetic resistance along the air gap in the rotor iron of the motor can be homogenized in a simple and economical way. By introducing a number of magnetic flux influencing groups it is possible to suppress or at least minimize the fluctuations of the magnetic flux density in the teeth of a stator. This approach significantly reduces any iron losses that may occur, especially in the field weakening range. The result is the suppression of the switching back and forth of the magnetic flux between the rotor and the stator of the drive motor.

In the event of an arbitrary number of magnetic layers, the provision of a number of magnetic flux influencing groups can be implemented in the pole of the rotor. The inventive method is flexible for a number of different designs of electric drive motors. Similarly the number of magnetic flux influencing groups can be implemented independently of the number of pole pairs in the rotor of the drive motor.

The drive motor according to the invention can be made available at a low cost, because the recesses can be introduced in the course of a punching process, which is provided in any event for the manufacture of the rotor iron, and there is no need for any additional processing steps. On the whole, the proposed method leads to an increase in efficiency, especially at high speeds, at which the electric drive motor is run in the field weakening mode. If such a drive motor is used as the main drive of a battery-powered electric vehicle, then the result is an extended cruising range using an existing battery having a specified energy content. Since battery operated vehicles are generally limited in their cruising range, the customer gains substantial benefits from such an increased cruising range. On the other hand, the required battery capacity can be reduced while still retaining a given cruising range of a battery-powered vehicle. In this case a vehicle can be made available at a reduced cost, because at the present time the electric battery accumulator represents the largest cost factor of the vehicle.

In one practical embodiment the number of air-filled recesses is designed in the shape of slots. This feature ensures that the magnetic flux influencing groups have a minimum effect on the q inductance (that is, the inductance acting along the q axis) and do not have a negative impact on the field of the drive motor.

According to an additional practical embodiment, the number of air-filled recesses has a first end, which is arranged in each case adjacent to an outer peripheral surface of the rotor. This feature minimizes the area, remaining between the air-filled recesses and the outer peripheral surface, in the area of the air gap, so that the fluctuation of the magnetic flux density in the stator teeth can be suppressed or minimized. Especially in this context it is provided that the distance between the first end of the respective air-filled recess and the outer peripheral surface of the rotor is approximately the same. As an alternative, at least some of the first ends of a respective air-filled recess can abut the outer peripheral surface of the rotor. Hence, these recesses are designed as grooves.

According to an additional embodiment, the air-filled recesses have a second end, which is oriented in the direction of a d axis of the respective pole. This feature achieves the goal that the air-filled recesses run at least in sections approximately parallel to a q axis transversely oriented to the d axis. Consequently the orientation of the recesses is such that these recesses have a minimum effect on the q inductance, so that the field of the permanent magnets is not negatively affected.

According to an additional practical embodiment, the number of air-filled recesses of a magnetic flux influencing group is arranged in parallel or at an angle to each other. This embodiment, too, serves the purpose of minimizing the effect on the q inductance and of not adversely affecting the field of the permanent magnets.

Furthermore, a practical embodiment provides that the number of air-filled recesses of a magnetic flux influencing group has the same length or a different length. This feature, too, does not adversely affect the course of the magnetic flux through the air-filled recesses, but, nevertheless, achieves the advantages of an increase in efficiency and a reduction in iron losses.

Furthermore, it is an advantage that one magnetic layer of the magnet arrangement of a first pole abuts at least in sections a second pole, so that in each case there is a magnetic flux influencing group between this magnetic layer and the second pole.

As an alternative or in addition, given a plurality of radially stacked magnetic layers, one of the magnetic flux influencing groups is arranged in a pole between two magnetic layers and adjacent to the outer peripheral surface of the rotor.

In an additional specific embodiment each of the opposite ends of a magnet of a magnetic layer has an air cavern for conducting the flux, and a respective magnetic flux influencing group is arranged between the air caverns of two magnetic layers arranged one above the other. As the number of magnetic layers increases, an increasing number of magnetic flux influencing groups per pole in a drive motor is also provided.

According to an additional practical embodiment, a first magnet and a second magnet of a respective magnetic layer are arranged in a V configuration in the rotor, and a respective magnetic flux influencing group is arranged between the first magnets of two stacked magnetic layers and between the second magnets of two stacked magnetic layers.

The drive motor is preferably designed as a permanently excited synchronous motor. The buried magnets, provided in the rotor of the drive motor according to the invention, are preferably permanent magnets.

BRIEF DESCRIPTION OF THE DRAWINGS

The invention is explained in detail below with reference to the accompanying figures. Referring to the drawings.

DETAILED DESCRIPTION OF THE DRAWINGS

Figure 3:
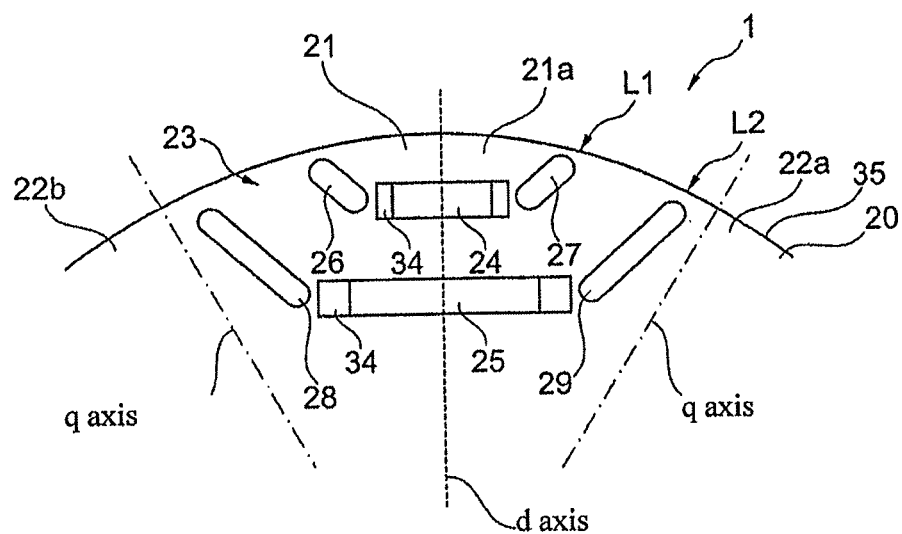
FIG. 3 shows a rotor arrangement, known from the prior art, with two buried magnetic layers according to a second variant.
Figure 4:
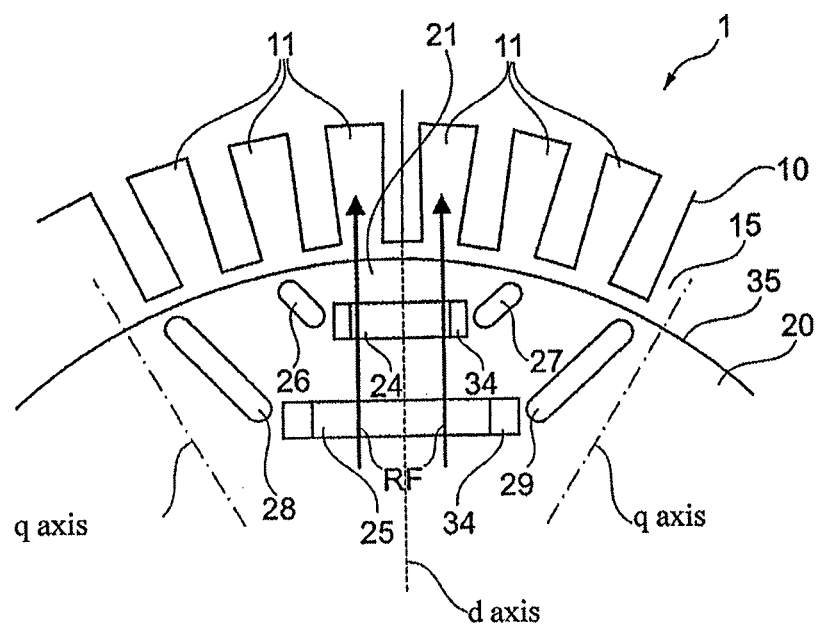
FIG. 4 shows the course of the magnetic flux in a pole of the rotor without any current in the stator in the rotor arrangement according to FIG. 3.
Figure 5:
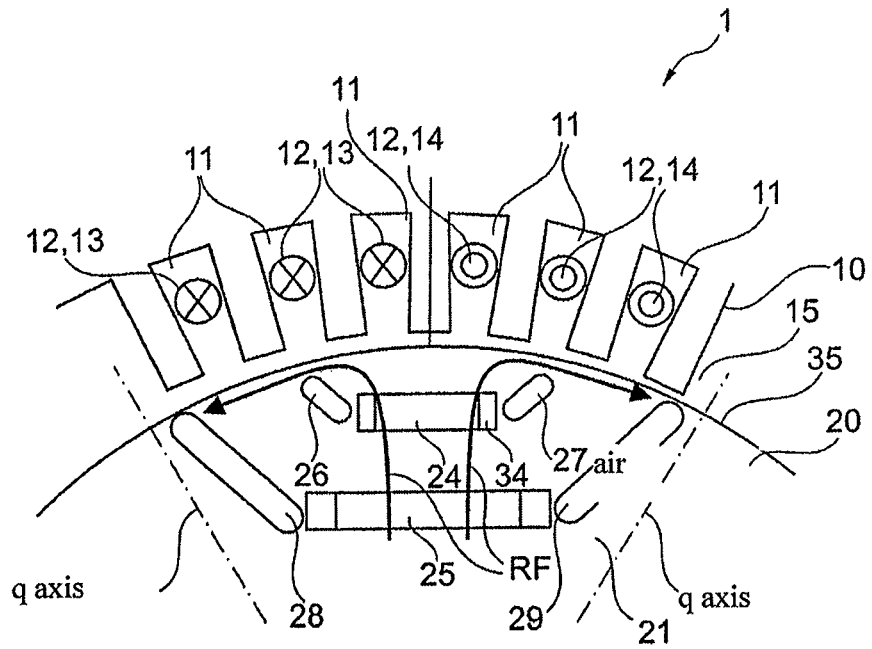
FIG. 5 shows the course of the magnetic flux in a pole of the rotor in field weakening mode by means of a field weakening current, impressed upon the stator, in the rotor arrangement according to FIG. 3.
Figure 6:
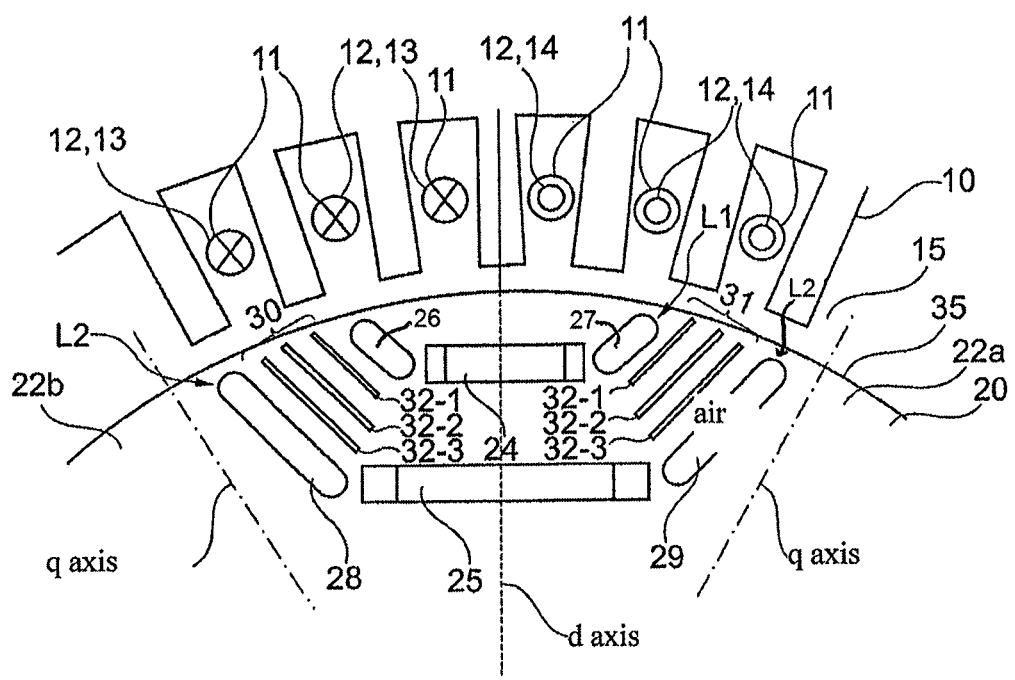
FIG. 6 shows a pole of a rotor of an inventive electric drive motor according to a first design variant.

The inventive electric drive motor 1, shown in FIG. 6, is based on the variant of the so-called parallel magnet arrangement (described above in connection with FIG. 3) comprising a number of magnetic layers L1, L2 in a rotor 20. In addition to the elements, described above in FIGS. 3 and 5, the rotor 20 has two magnetic flux influencing groups 30, 31. Each of the magnetic flux influencing groups 30, 31 comprises a number of air-filled recesses. In the exemplary embodiment each of the two magnetic flux influencing groups 30, 31 has, by way of an example, three air-filled recesses 32-1, 32-2, 32-3 or 33-1, 33-2 and 33-3 respectively. The recesses of a respective magnetic flux influencing group 30, 31 are configured as slots. The magnetic flux influencing group 30 is arranged between the air caverns 26, 28 of the magnetic layers L1, L2. The magnetic flux influencing group 31 is arranged correspondingly between the air cavern 27 of the magnetic layer L1 and the air cavern 29 of the magnetic layer L2. A respective first end of a respective air-filled recess 32-1, 32-2, 32-3 of the group 30 and 33-1, 33-2, 33-3 of the group 31 is arranged adjacent to an outer peripheral surface 35 of the rotor 20. At the same time the distance between the first end of a respective air-filled recess and the outer peripheral surface of the rotor is approximately the same. A respective second end of the air-filled recesses is oriented in the direction of the d axis of the pole 21a. The number of air-filled recesses 32-1, 32-2, 32-3 of the group 30 and the recesses 33-1, 33-2, 33-3 of the group 31 are arranged parallel to each other, and, in so doing, the recesses of a respective group have a different length. This feature ensures that the air-filled recesses have a minimum effect on the q inductance, and, as a result, the field of the magnets 24, 25 is not adversely affected.

The air-filled recesses that are provided between the air caverns of adjacent magnetic layers allow the fluctuations of the magnetic flux density in the stator teeth to be suppressed or at least to be reduced. As a result, the iron losses that are sustained, above all in the field weakening range, are significantly reduced. Such a reduction results in an increase in the efficiency of the electric drive motor, especially at high speeds. The recesses can be introduced in the course of the punching operation of the recesses 24, 25 and the air caverns 26, 27, 28, 29 so that there is no need for additional production steps. Therefore, the production costs are not influenced in a disadvantageous way by the proposed modification of the rotor.

In contrast to the drawing shown in FIG. 6, an additional magnetic flux influencing group comprising a number of air-filled recesses can be provided between the air cavern 28 and the q axis relative to the pole 22b and between the air cavern 29 and the q axis relative to the adjacent pole 22a. In this way the influencing of the magnetic field can also be improved in the above-described manner in the edge region of a respective pole.

The recesses 32-1, 32-2, 32-3 of the group 30 and the recesses 33-1, 33-2, 33-3 of the group 31 are arranged in essence parallel to the adjacent air caverns 26, 28 and 27, 29 respectively. As the recesses draw nearer to the air caverns 28, 29 of the magnetic layer L2, the length of the recesses increases, as a function of the size of the air caverns 26, 27 of the magnetic layer L1. As a result, the path of magnetic flux, which turns away from the magnet 25 as it flows through the magnetic flux influencing groups 30, 31, is not changed in a disadvantageous way.

Figure 1:
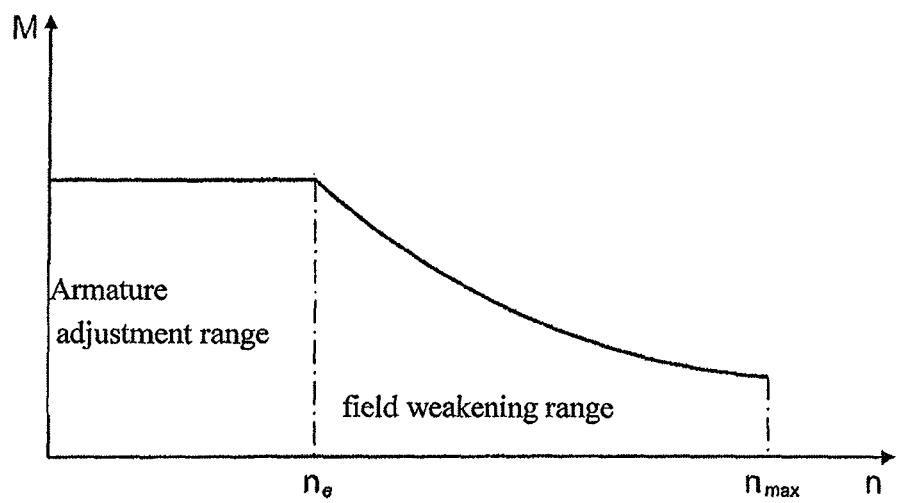
FIG. 1 shows the relationship, known from the prior art, between the torque and the speed of a permanently excited synchronous motor.
Figure 2:
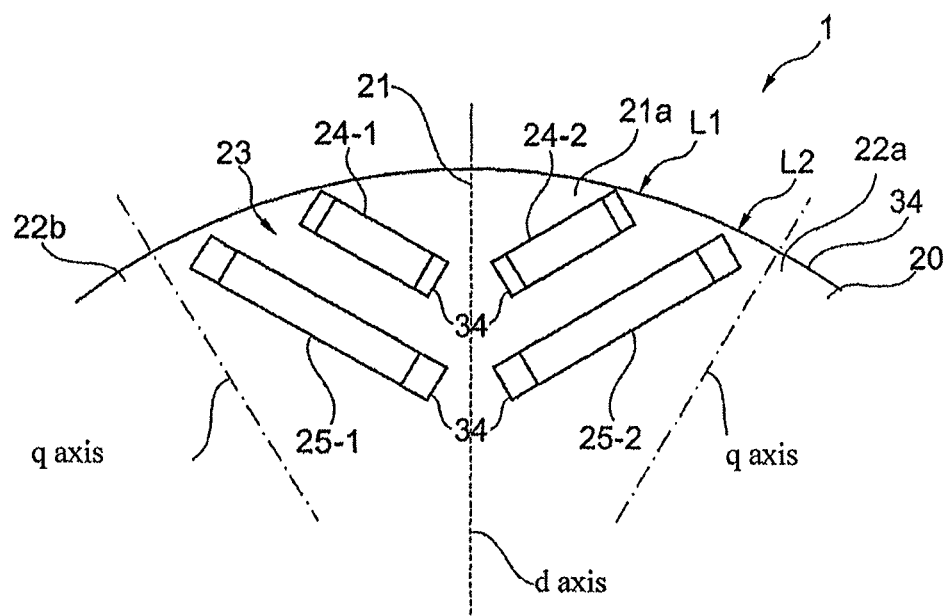
FIG. 2 shows a rotor arrangement, known from the prior art, with two buried magnetic layers according to a first variant.
Figure 7:
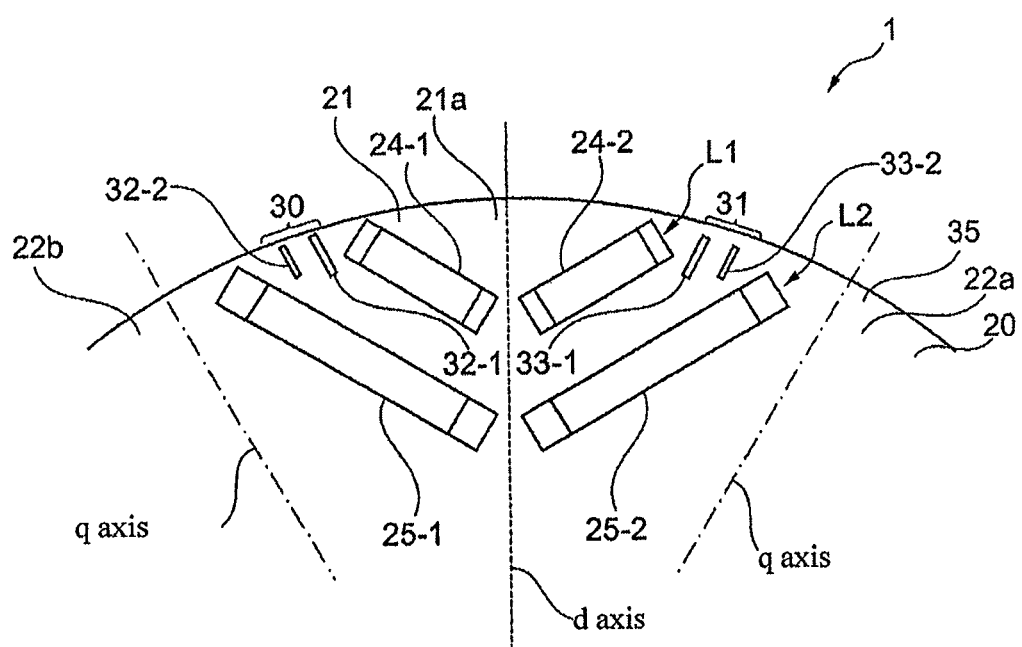
FIG. 7 shows a pole of a rotor of an inventive electric drive motor according to a second design variant.

FIG. 7 shows a second exemplary embodiment of a detail of a rotor 20 of an inventive electric drive motor, and said second exemplary embodiment is based on the variant described in connection with FIG. 2. In this exemplary embodiment, a magnetic flux influencing group 30, 31 is provided between the first magnets 24-1, 25-1 of the first and second magnetic layers L1, L2 and the second magnets 24-2, 25-2 of the first and second magnetic layers L1, L2. This figure shows only for the sake of an example that each of the magnetic flux influencing groups 30, 31 has two air-filled recesses 32-1, 32-2 and 33-1, 33-2 respectively, which are different in length and are arranged parallel to each other. The recesses 32-1, 32-2 and 33-1, 33-2 respectively of the group 31 are oriented in essence parallel to the adjacent q axis, owing to the V shaped configuration of the first and the second magnets of the respective magnetic layers L1, L2.

In this embodiment, the first ends of the respective recesses also approach the outer peripheral surface 35 of the rotor 20.

The invention claimed is:

1. An electric drive motor for a vehicle, comprising:
   a stator;
   a rotor having at least one pole pair, each pole of a respective pole pair comprising a magnet arrangement having at least one buried magnetic layer;
   wherein each pole has a number of magnetic flux influencing groups, each group having a number of air-filled recesses, which are not assigned to a magnet of a respective magnetic layer, for purposes of flux conductance.

2. The electric drive motor according to claim 1, wherein the number of air-filled recesses are configured as slots.

3. The electric drive motor according to claim 2, wherein the air-filled recesses have first ends operatively arranged in each case adjacent to an outer peripheral surface of the rotor.

4. The electric drive motor according to claim 2, wherein the air-filled recesses have second ends oriented in a direction toward a d-axis of the respective pole.

5. The electric drive motor according to claim 1, wherein the air-filled recesses have first ends operatively arranged in each case adjacent to an outer peripheral surface of the rotor.

6. The electric drive motor according to claim 5, wherein distances between the first ends of respective air-filled recesses and the outer peripheral surface of the rotor are approximately the same.

7. The electric drive motor according to claim 5, wherein at least some of the first ends of the respective air-filled recesses abut the outer peripheral surface of the rotor.

8. The electric drive motor according to claim 5, wherein the air-filled recesses have second ends oriented in a direction toward a d-axis of the respective pole.

9. The electric drive motor according to claim 1, wherein the air-filled recesses of a magnetic flux influencing group are arranged one of in parallel and at an angle to one other.

10. The electric drive motor according to claim 1, wherein the air-filled recesses of a magnetic flux influencing group have one of identical and different lengths.

11. The electric drive motor according to claim 1, wherein one magnetic layer of the magnet arrangement of a first pole abuts at least in sections a second pole, and further wherein in each case a magnetic flux influencing group is arranged between the one magnetic layer and the second pole.

12. The electric drive motor according to claim 1, wherein a plurality of radially stacked magnetic layers are provided, one of the magnetic flux influencing groups being arranged in a pole between two magnetic layers and adjacent to the outer peripheral surface of the rotor.

13. The electric drive motor according to claim 1, wherein each of opposite ends of the magnet of a magnetic layer has an air cavern for conducting the flux; and further wherein a respective magnetic flux influencing group is arranged between the air caverns of two magnetic layers arranged one above the other.

14. The electric drive motor according to claim 1, wherein a first magnet and a second magnet of a respective magnetic layer are arranged in a V-configuration in the rotor; and further wherein a respective magnetic flux influencing group is arranged between the first magnets of two stacked magnetic layers and between the second magnets of the two stacked magnetic layers.

15. The electric drive motor according to claim 1, wherein the electric drive motor is a permanently excited synchronous motor.

16. The electric drive motor according to claim 1, wherein the electric drive motor is a motor vehicle electric drive motor.

* * * * *